United States Patent
Vishin et al.

(10) Patent No.: US 7,769,957 B2
(45) Date of Patent: Aug. 3, 2010

(54) PREVENTING WRITEBACK RACE IN MULTIPLE CORE PROCESSORS

(75) Inventors: Sanjay Vishin, Sunnyvale, CA (US); Adam Stoler, Cambridge, MA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 439 days.

(21) Appl. No.: 11/767,225

(22) Filed: Jun. 22, 2007

(65) Prior Publication Data
US 2008/0320232 A1    Dec. 25, 2008

(51) Int. Cl.
G06F 12/08    (2006.01)
G06F 15/167    (2006.01)

(52) U.S. Cl. ................................. 711/141; 711/147
(58) Field of Classification Search ............... 711/151, 711/152
See application file for complete search history.

(56) References Cited

U.S. PATENT DOCUMENTS

| | | | |
|---|---|---|---|
| 5,572,704 A | 11/1996 | Bratt et al. | |
| 5,632,025 A | 5/1997 | Bratt et al. | |
| 5,740,402 A | 4/1998 | Bratt | |
| 6,192,451 B1 * | 2/2001 | Arimilli et al. | 711/141 |
| 6,192,452 B1 | 2/2001 | Bannister et al. | |
| 6,484,242 B2 | 11/2002 | Hosoya et al. | |
| 6,678,798 B1 * | 1/2004 | Kuskin et al. | 711/141 |
| 6,678,799 B2 * | 1/2004 | Ang | 711/141 |
| 6,681,283 B1 | 1/2004 | Thekkath et al. | |
| 6,732,208 B1 * | 5/2004 | Alsaadi et al. | 710/112 |
| 6,915,387 B1 | 7/2005 | Huffman et al. | |
| 7,478,190 B2 * | 1/2009 | Balasubramonian et al. | 710/316 |
| 2004/0024836 A1 * | 2/2004 | Keller et al. | 709/213 |
| 2007/0043911 A1 | 2/2007 | Hetherington | |
| 2007/0043913 A1 * | 2/2007 | Hetherington et al. | 711/141 |
| 2007/0192541 A1 | 8/2007 | Balasubramonian et al. | |
| 2009/0089510 A1 * | 4/2009 | Lee et al. | 711/141 |

OTHER PUBLICATIONS

"International Search Report PCT/US08/67676", Oct. 22, 2008.
"International Search Report PCT/US08/67705", Oct. 22, 2008.

* cited by examiner

Primary Examiner—Matt Kim
Assistant Examiner—Sean Rossiter
(74) Attorney, Agent, or Firm—Law Office of Jonathan Hollander PC

(57) ABSTRACT

A processor prevents writeback race condition errors by maintaining responsibility for data until the writeback request is confirmed by an intervention message from a cache coherency manager. If a request for the same data arrives before the intervention message, the processor core unit provides the requested data and cancels the pending writeback request. The cache coherency data associated with cache lines indicates whether a request for data has been received prior to the intervention message associated with the writeback request. The cache coherency data of a cache line has a value of "modified" when the writeback request is initiated. When the intervention message associated with the writeback request is received, the cache lines's cache coherency data is examined. A change in the cache coherency data from the value of "modified" indicates that the request for data has been received prior to the intervention and the writeback request should be cancelled.

19 Claims, 7 Drawing Sheets

200

205
SELECT MODIFIED CACHE LINE FOR WRITEBACK TO MEMORY

210
SEND EXPLICIT WRITEBACK REQUEST TO COHERENCY MANAGER

215
WAIT FOR MESSAGE FROM COHERENCY MANAGER

220

SELF-INTERVENTION MESSAGE ASSOCIATED WITH WRITEBACK REQUEST →

REQUEST FOR MODIFIED CACHE LINE DATA →

230
MARK MODIFIED CACHE LINE AS INVALID

225
PROVIDE MODIFIED CACHE LINE DATA TO REQUESTER

235
RECEIVE MESSAGE REQUESTING MODIFIED CACHE LINE DATA

240
RETURN CACHE MISS

FIG. 2A

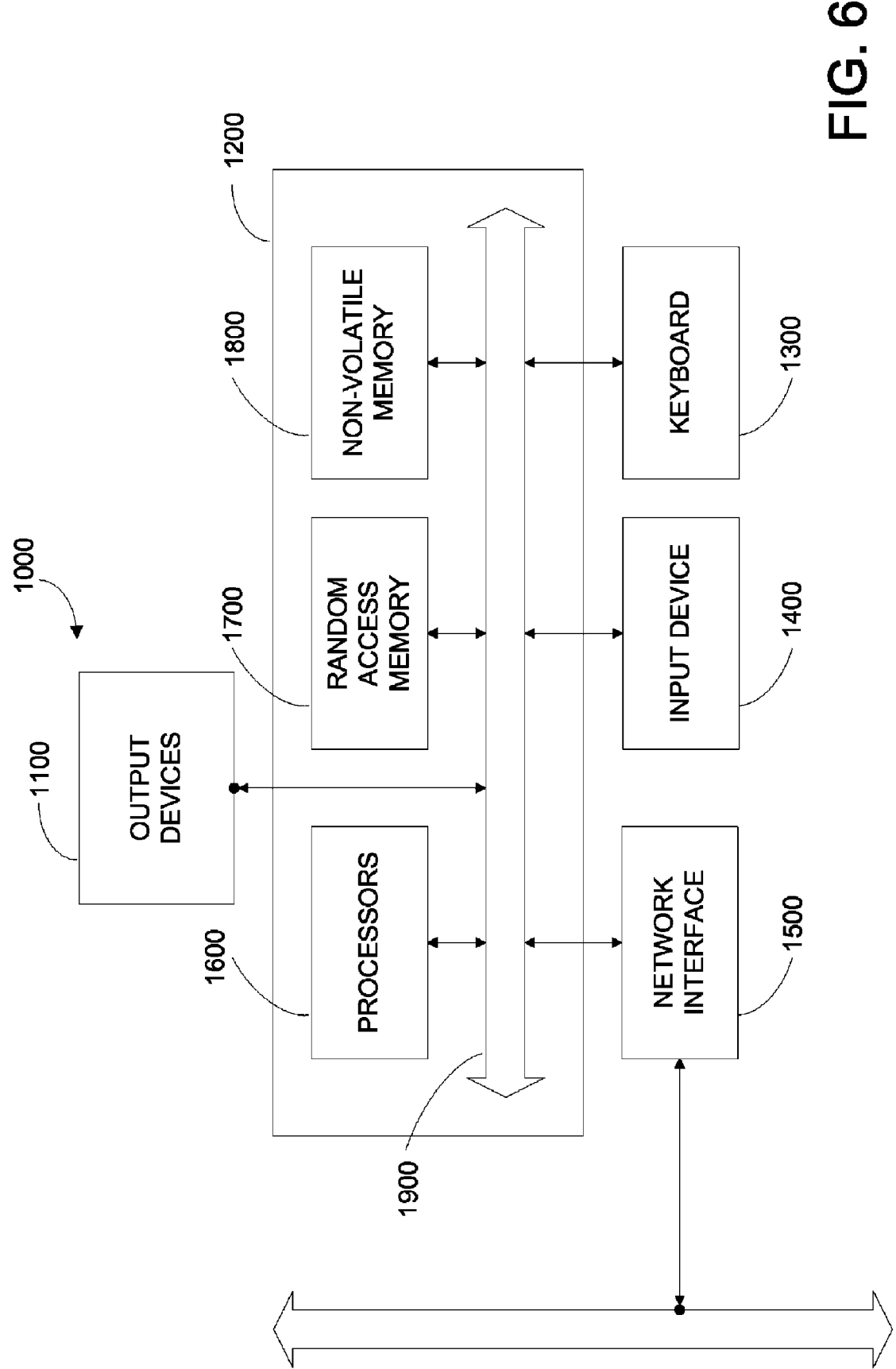

PREVENTING WRITEBACK RACE IN MULTIPLE CORE PROCESSORS

BACKGROUND OF THE INVENTION

The invention relates to the field of microprocessor architectures. Microprocessor designers are continually striving to improve microprocessor performance, designing microprocessor architectures that provide, for example, increased computational abilities, increased operating speeds, reduced power consumption, and/or reduced cost. With many previous microprocessor architectures, it has become increasingly difficult to improve microprocessor performance by increasing their operating frequency. As a result, many newer microprocessor architectures have focused on parallel processing to improve performance.

One parallel processing technique employed in microprocessor architectures is multiple processing cores. This technique utilizes multiple independent processors, referred to as cores, operating in parallel to execute software applications. Two or more processing cores may be implemented within the same integrated circuit die, within multiple integrated circuit dies integrated within the same integrated circuit package, or a combination of these implementations. Typically, multiple processing cores share a common interface and may share other peripheral resources.

Microprocessors typically operate much faster than typical memory interfaces. Additionally, many types of electronic memory have a relatively long latency time period between the time when a processor requests data and the time the requested data is received. To minimize the time a microprocessor spends idle and waiting for data, many microprocessors use cache memory to store a temporary copy of program instructions and data. Typical cache memory is highly integrated with a microprocessor, often within the same integrated circuit die or at least within the same integrated circuit package. As a result, cache memory is very fast and has low latency. However, this tight integration limits the size of the cache memory.

Cache memory is typically partitioned into a fixed number of cache memory locations, referred to as cache lines. Typically, each cache line is associated with a set of system memory addresses. Each cache line is adapted to store a copy of program instructions and/or data from one of its associated system memory addresses. When a processor or processor core modifies or updates data stored in a cache memory location, this data will eventually need to be copied back into system memory. Typically, a processor or processor core defers updating system memory, referred to as a writeback operation, until the processor core needs the cache line to store a copy of different data from system memory.

Additionally, in processors with multiple processor cores, each processor core can have a separate cache memory. As a result, the processor must ensure that copies of the same data in different cache memories are consistent. This is referred to as cache coherency. Furthermore, one processor core may read from another processor core's cache memory, rather than copying the corresponding instructions and/or data from system memory. This reduces processor idle time and redundant accesses to system memory.

It is desirable for a processor to perform writeback operations efficiently. It is also desirable for the processor to ensure that writeback operations and reads between processor core caches do not interfere with each other. It is further desirable for processors to efficiently maintain cache coherency for multiple processor cores with separate cache memories operating independently. It is also desirable to minimize the size and complexity of the portion of the processor dedicated to cache coherency.

BRIEF SUMMARY OF THE INVENTION

An embodiment of the invention prevents writeback race conditions from causing processor errors when a processor core unit issues a writeback request for data at approximately the same time that another processor core unit requests the same data. A processor core unit maintains responsibility for data until a writeback request is confirmed by the receipt of an intervention message from a cache coherency manager unit. If a request for the same data arrives before the intervention message associated with the writeback request, the processor core unit provides the requested data and cancels the pending writeback request. The request for the data will initiate an implicit writeback of the data, making the pending writeback request redundant. In an embodiment, the processor core unit cancels the request by waiting for the receipt of the intervention message and then responding with a cancellation message.

In a further embodiment, the cache coherency data associated with cache lines indicates to the processor core unit whether a request for data has been received prior to the intervention message associated with the writeback request. The cache coherency data of a cache line has a value of "modified" when the writeback request is initiated. When the intervention message associated with the writeback request is received by the processor core unit from the cache coherency manager unit, the cache coherency data of the cache line is examined. If the cache coherency data of the cache line has been changed from the value of "modified" (for example to "shared" or "invalid"), this indicates that the request for data has been received prior to the intervention message associated with the writeback request and the writeback request should be cancelled.

An embodiment of the invention reduces the complexity of the logic of the cache coherency manager unit by leveraging the data path for intervention messages and responses to carry data associated with writeback requests. In an embodiment, a processor core unit sends a writeback request to the cache coherency manager unit. The request does not include the writeback data. Upon receiving an intervention message associated with the writeback request, the processor core unit provides an intervention message response to the cache coherency manager unit indicating that the writeback operation should not be cancelled. The intervention message response includes the writeback data. Because the cache coherency manager already requires a data path to handle data transfers between processor core units, little or no additional overhead needs to be added to the cache coherency manager to handle data associated with writeback request.

BRIEF DESCRIPTION OF THE DRAWINGS

The invention will be described with reference to the drawings, in which:

FIGS. 2A-2B illustrate methods of performing writeback operations according to embodiments of the invention;

FIG. 6 illustrates an example computer system suitable for use with an embodiment of the invention.

DETAILED DESCRIPTION OF THE INVENTION

Figure 1:
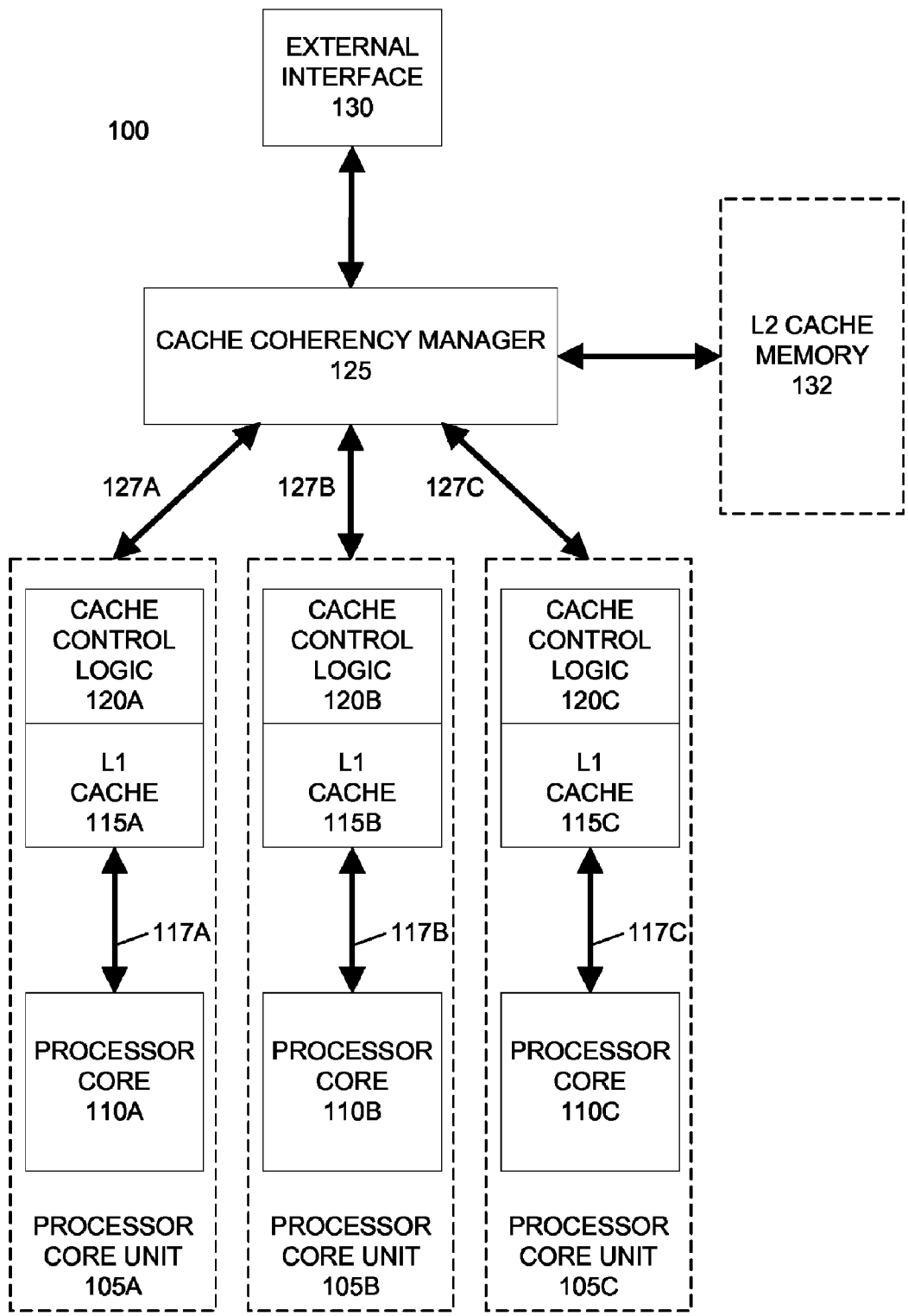
FIG. 1 illustrates an example processor according to an embodiment of the invention.

FIG. 1 illustrates an example processor 100 according to an embodiment of the invention. Embodiments of example processor 100 include two or more processor core units 105, such as processor core units 105A, 105B, and 105C. Each of the processor core units 105 includes at least one processor core. For example, processor core units 105A, 105B, and 105C include processor cores 110A, 110B, and 110C, respectively.

Processor cores 110 are capable of performing one or more information processing functions on data. Processor cores 110 may perform a fixed sequence of functions or be capable of performing a flexible sequence of functions in response to program instructions. Each of the processor cores 110 may be configured according to RISC and/or CISC architectures and may process scalar or vector data types using SISD or SIMD instructions. Processor cores 110 may include general purpose and specialized register files and execution units configured to perform logic functions, arithmetic or other mathematical functions, data manipulation functions, or any other types of functions capable of being implemented using digital logic circuits. Each of the processor cores 110 may have identical functions and capabilities or may have different functions and capabilities specialized for different purposes.

In an embodiment, processor core units 105 are connected with a cache coherency manager unit 125 via data buses 127. Data buses 127 may be implemented as point-to-point data connections between each of the processor core units 105 and the cache coherency manager unit 125, such as data buses 127A, 127B, and 127C. The cache coherency manager unit 125 facilitates the transfer of instructions and/or data between processor core units 105, system memory and I/O via external interface 130 and/or with optional shared L2 cache memory 132. In general, processor core units 105 may share all or a portion of system memory and/or one or more optional levels of cache memory, such as optional shared L2 cache memory 132.

An embodiment of the cache coherency manager unit 125 can receive system memory read and write requests, read requests from other cache memories, and/or writeback requests from each of the processor core units in parallel and potentially simultaneously. An embodiment of the cache coherency manager unit 125 can process and service these requests in any arbitrary order. For example, an embodiment of the cache coherency manager unit 125 can reorder requests to optimize memory accesses, to load balance requests, to give priority to one or more processor core unit over the other processor core units, and/or to give priority to one or more types of requests over the other types of requests. In some implementations, processor core units 105 may utilize software locking primitives to ensure a desired ordering of memory accesses from multiple processor cores In an embodiment, processor 100 is implemented within an integrated circuit package. Further embodiments of processor 100 may be implemented either within a single integrated circuit die within the integrated circuit package or within multiple integrated circuit dies within a single integrated circuit package.

Each of the processor core units 105 include one or more levels of cache memory to temporarily store data potentially needed by its associated processor core. The data stored in the cache memory can include program instructions and/or program data. Typical cache memories are organized into cache lines. Each cache line stores a copy of data corresponding with one or more virtual or physical memory addresses. Each cache line also stores additional data used to manage the cache line, such as cache line tag data used to identify the memory address associated with a cache line and cache coherency data used to synchronize the data in the cache line with other caches and/or with the computer system's memory. The cache tag can be formed from all or a portion of the memory address associated with the cache line.

Example processor core units 105A, 105B, and 105C include L1 cache units 115A, 115B, and 115C, respectively. L1 cache units 115 are connected with their associated processor cores 110 via data buses 117A, 117B, and 117C. Although shown for clarity as a single bus, each of the data buses 117 may be comprised of one or more data buses between an L1 cache unit and its associated processor core. Embodiments of L1 cache units 115 may also include cache control logic units 120 to facilitate the transfer of data to and from their respective L1 cache units. Cache units 115 may be fully associative, set associative with two or more ways, or direct mapped. For clarity, each of the L1 cache units 115 is illustrated as a single cache memory capable of storing any type of data potentially required by the processor core unit; however, embodiments of the invention can include separate L1 cache units in each processor core unit for storing different types of data separately, such as program instruction caches, program data caches, and translation lookaside buffer data caches.

In an embodiment, each of the L1 cache units 115 can store a limited number of cache lines. When the capacity of a L1 cache unit is exceeded, one of the cache lines is removed from the L1 cache to make room for a new cache line. The removed cache line is referred to as a victim line. Victim cache lines can be selected according to a cache replacement policy, such as selecting a least recently used cache line, and/or according to caching instructions associated with a program. If the data in the victim line has not been modified by the associated processor core, then the data in the victim line may be discarded or overwritten. However, if the data in a victim line has been modified by the associated processor core, then the modified data must be copied back to the system memory (or a different cache level memory) to ensure correct operation of programs. The copying of modified cache data from a cache memory to a higher-level cache memory or system memory is referred to as a writeback operation.

When one of the processor core units 105 requests access to data, the cache coherency manager unit 125 may attempt to locate a copy of the requested data in the cache memory of one of the other processor core units 105. The cache coherency manager unit 125 may perform this search for the requested data in parallel with speculative read requests for this data from shared system memory and/or shared higher-level cache memory. Embodiments of the cache coherency manager unit 125 may use a snoopy access scheme or a directory-based access scheme to determine if any of the processor core units 105 include the requested data in their caches. In a snoopy access scheme, requests for data are broadcast to some or all of the processor core units 105. In response, the processor core units 105 perform cache snoop operations to determine if their respective caches include the requested data and respond to the cache coherency manager unit 125. In a directory-based access scheme, the cache coherency manager unit 125 queries a directory to determine if any of the processor core units 125 include a copy of the requested data. The directory can be included within the cache coherency manager 125 or external to the cache coherency manager unit 125 and connected via a bus or data communications interconnect.

Figure 2B:
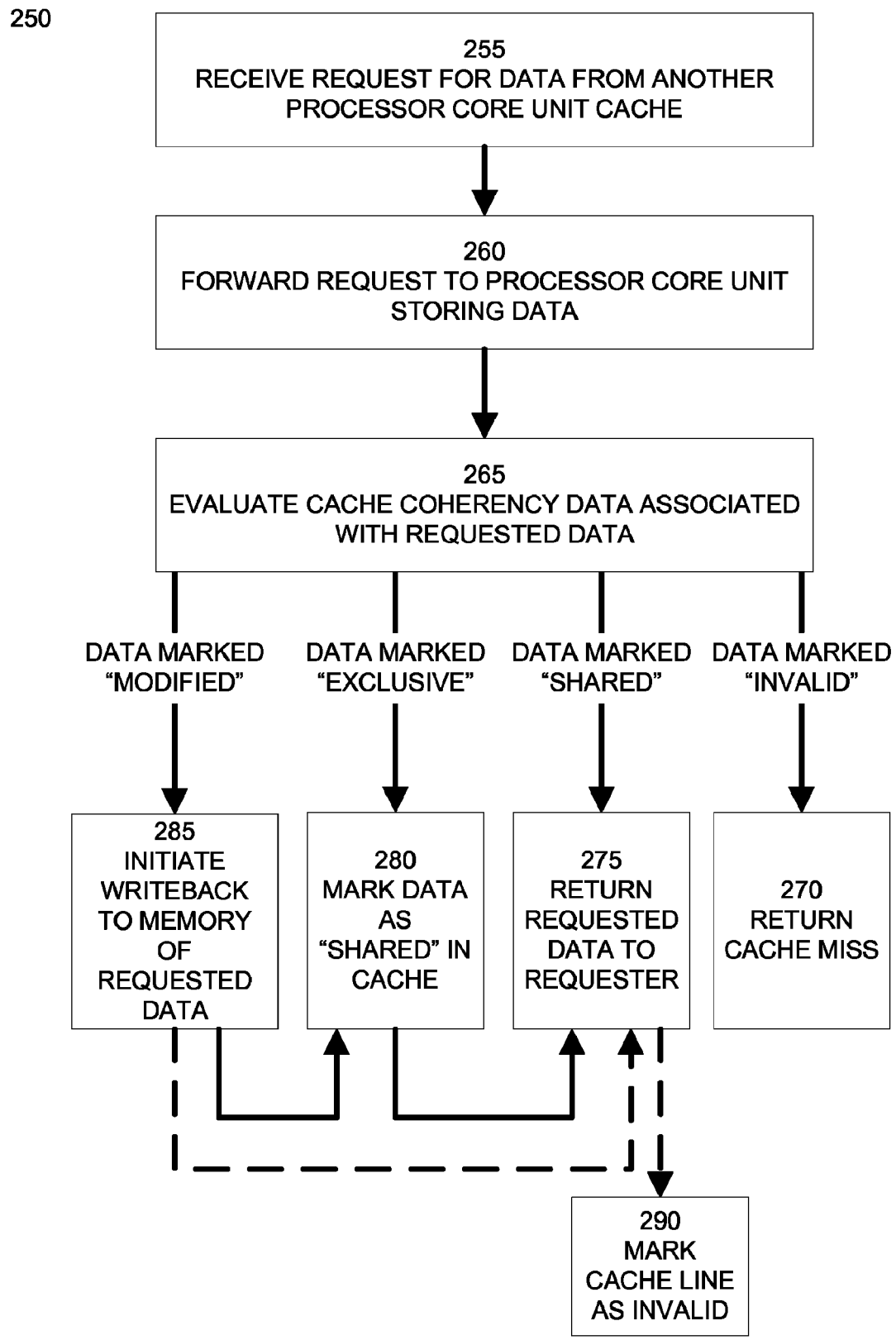

FIG. 2A illustrates a method 200 for performing a first type of writeback operation according to an embodiment of the invention. The writeback operation of method 200 is referred to as an explicit writeback operation, as it is explicitly initiated by the processor core unit storing modified data in its cache memory. As discussed in detail below, a processor core may initiate an explicit writeback request by sending an explicit writeback request to the cache coherency manager. When the cache coherency manager is ready to process this explicit writeback request, it sends a confirmation message, referred to as a self-intervention request, back to the requesting processor core unit. The self-intervention message allows the requesting processor core unit to confirm that the explicit writeback should proceed and also indicates to the requesting processor core unit that it is no longer responsible for providing this data to any other processor cores units.

Method 200 begins with step 205 selecting a cache line including modified data for writeback operation. As discussed above, a cache line can be selected for a writeback operation when the L1 cache memory is at maximum capacity and the processor core requires that cache line to store other data. In further embodiments, the processor core unit can selected a modified cache line for a writeback operation under different circumstances, such as in response to a specific program instruction flushing some or all of the processor core's cache memory.

In an embodiment, each cache line includes cache coherency data indicating, at the least, whether its data is modified. In this embodiment, when a cache line is selected as a victim line, the processor core unit can evaluate the associated cache coherency data to determine if the victim line includes modified data and thus requires a writeback operation to preserve the modified data. For example, the MESI cache coherency protocol marks cache lines as modified ("M"); exclusive ("E"), which means that the processor core unit has the only cached copy of the data and is free to modify it; shared ("S"), which means that two or more processor core units have cached this data and each processor core can read this data but cannot modify it; or invalid ("I"), which means the data in the cache line is invalid and the processor core unit can store other data in this cache line. Other cache coherency schemes, such as MSI, MOSI, and MOESI coherency schemes, can also be used with embodiments of the invention.

Step 210 sends an explicit writeback request to the cache coherency manager unit. In an embodiment, the explicit writeback request identifies the cache line storing the modified data and/or the system memory address that the modified data should be stored in. In some implementations, the explicit writeback request also includes the modified data to be written back to system memory or optionally a higher level cache memory.

As discussed above, the cache coherency manager unit can process requests such as the writeback request sent in step 210 and competing requests from other processor core units in any order. To maintain cache coherency, in step 215 the processor core unit requesting the explicit writeback waits for a confirmation message from the cache coherency manager unit before allowing the selected cache line to be overwritten with different data. During this waiting period, the processor core unit will still be responsible for providing the modified cache line data to any other requesting processor core units. Additionally, during this waiting period, the processor core unit and its associated processor core may execute other instructions, process other data, and provide any other data to any other requesting processor core units, rather than stalling or sitting idle.

Upon receiving a message from the cache coherency manager unit, decision block 220 evaluates the received message. If the message received from the cache coherency manager unit is a request for the modified cache line data, then step 225 provides this modified data to the requesting processor core unit. This can occur if another processor core unit requests the modified cache line data at approximately the same time as the writeback request is issued and the cache coherency manager unit processes the data request before the writeback request.

In an embodiment of step 225, the processor core unit including the modified cache line data communicates a copy of the modified data to the cache coherency manager unit, which in turn forwards the copy of the modified data to the requesting processor core unit. Following step 225, the processor core unit returns to step 215 to await another message from the cache coherency manager unit.

Conversely, if upon receiving a message from the cache coherency manager unit, the decision block 220 determines that the message is a writeback confirmation message, referred to as a self-intervention message, associated with the writeback request sent in step 210, then method 200 proceeds to step 230.

Step 230 marks the selected modified cache line as invalid after the modified cache line is communicated to the cache coherency manager unit for writeback to the memory system or higher level cache. This allows the processor core unit to use the selected cache line to store other data. Once the selected cache line is marked as invalid, the processor core unit is no longer responsible for providing the modified cache line data to any requesting processor cores. Instead, if another processor core requires this data, it must be retrieved from another location, such as from system memory or an optional higher level cache memory. At this point, the processor core unit is finished with the explicit writeback operation. While the processor core unit is receiving and processing the self-intervention message associated with the writeback request in steps 220 and 230, the cache coherency manager performs the writeback of the modified data to system memory or shared higher-level cache memory. By the time that step 230 is complete, the cache coherency manager unit has either written the modified cache line data back to system memory or is in the process of doing so, such that the modified data in system memory will be accessible to any of the processor core units.

Following step 230, a processor core unit may yet receive a message requesting the modified cache line data. This can occur if another processor core unit requests the modified cache line data at approximately the same time as the writeback request is issued and the cache coherency manager unit processes the writeback request first. In this case, in optional step 235, the processor core unit formerly storing the modified cache line receives a message requesting for the modified cache line data. Because this cache line is now marked as invalid, the processor core unit in step 235 returns a cache miss response to the coherency manager and/or the requesting processor core unit. The request for the modified cache data will then be fulfilled by retrieving the data from system memory or optionally a higher level cache memory.

As discussed above, a first processor core unit may receive requests from other processor core units for data in the first processor core unit's cache memory. Method 250 illustrates a method of handling data requests from other processor core units according to an embodiment of the invention shown in FIG. 2B. Method 250 can operate in conjunction with method 200 discussed above.

At step 255, a cache coherency manager unit receives a request for shared access of data from a processor core unit. In step 260, the cache coherency manager unit determines if the cache memory of another processor core unit includes the requested data. In an embodiment, the cache coherency manager unit issues a cache snoop message identifying the requested data to the other processor core units. The cache control logic of each processor core unit evaluates the cache snoop message to determine if its associated cache memory includes the requested data. The results of this determination are provided to the cache coherency manager unit. In directory-based scheme, the coherency manager accesses a directory to determine which processors potentially include the requested data.

If at least one processor core unit includes the requested data in its cache memory, in step 260 the cache coherency manager unit selects one of the appropriate processor core units and forwards the data request to that processor core unit to retrieve the requested data. Otherwise, the cache coherency manager unit requests the data from system memory. Because of the long latency in retrieving data from system memory, embodiments of the cache coherency manager may speculatively request data from system memory while performing the cache snoop. This system memory request can be later cancelled (or its results ignored) if the data is found in a cache memory of another processor core unit.

In step 265, the processor core unit receiving the data request identifies the cache line potentially storing the requested data. The receiving processor core unit evaluates the cache coherency data associated with this cache line to determine if the cache line includes a valid copy of the data available for use by other processor core units.

In an embodiment, if the cache coherency data of the cache line is set to "invalid," then the cache memory no longer has the requested data (for example due to the completion of an intervening writeback operation). As a result, step 270 returns a cache miss.

In an embodiment, if the cache coherency data of the cache line is set to "shared," then the cache memory has a valid and available copy of the requested data. As a result, step 275 returns the requested data to the requesting processor core unit, for example via the cache coherency manager. In some situations, multiple processor core units may have copies of the requested data in a shared state. In this case, the cache coherency manager unit may use a priority or load balancing scheme to select one of these processor core units to provide the requested data.

In an embodiment, if the cache coherency data of the cache line is set to "exclusive," then the cache memory has a valid copy of the requested data, but it is not available for sharing with other processor core units. As a result, step 280 changes the status of the cache line from "exclusive" to "shared," making the data available. Then step 275 returns the requested data to the requesting processor core unit.

In an embodiment, if the cache coherency data of the cache line is set to "modified," then the cache memory has a valid and modified copy of the requested data, but it is not available for sharing with other processor core units. Because all of the copies of the requested data, such as the system memory copy and copies in other cache memories, need to be consistent with the modified data in the cache line, step 285 initiates a writeback of the modified cache data. This type of writeback is referred to as an implicit writeback, as it is not initiated by the processor core associated with the modified cache data, but rather as the result of another processor core unit's request to share this data.

After step 285 initiates the writeback request, step 280 changes the status of the cache line from "modified" to "shared," making the data available. Then step 275 returns the requested data to the requesting processor core unit.

In a further embodiment of method 250, a first processor core can request exclusive access, rather than shared access, to data stored in the cache memory of another processor core. This may be requested so that the first processor core can modify the data. The type of data access (i.e. shared or exclusive) requested can be indicated within the request. A further embodiment of method 250 can implement this functionality by performing steps 255 to 265 as described above and then proceeding to step 285. In an embodiment, step 285 may optionally initiate a writeback of the modified cache line data to memory. Next, step 275 returns the requested modified data to the first processor core. Following step 275, step 290 marks the cache line as invalid.

Method 250 illustrates a method of handling data requests from other processor core units according to an embodiment of the invention. Method 250 can operate in conjunction with method 200 discussed above. Sometimes, a first processor core unit can issue an explicit writeback request for a modified cache line at approximately the same time that another processor core unit requests the modified data and triggers an implicit writeback. Under these circumstances, a race condition can occur.

Figure 3:
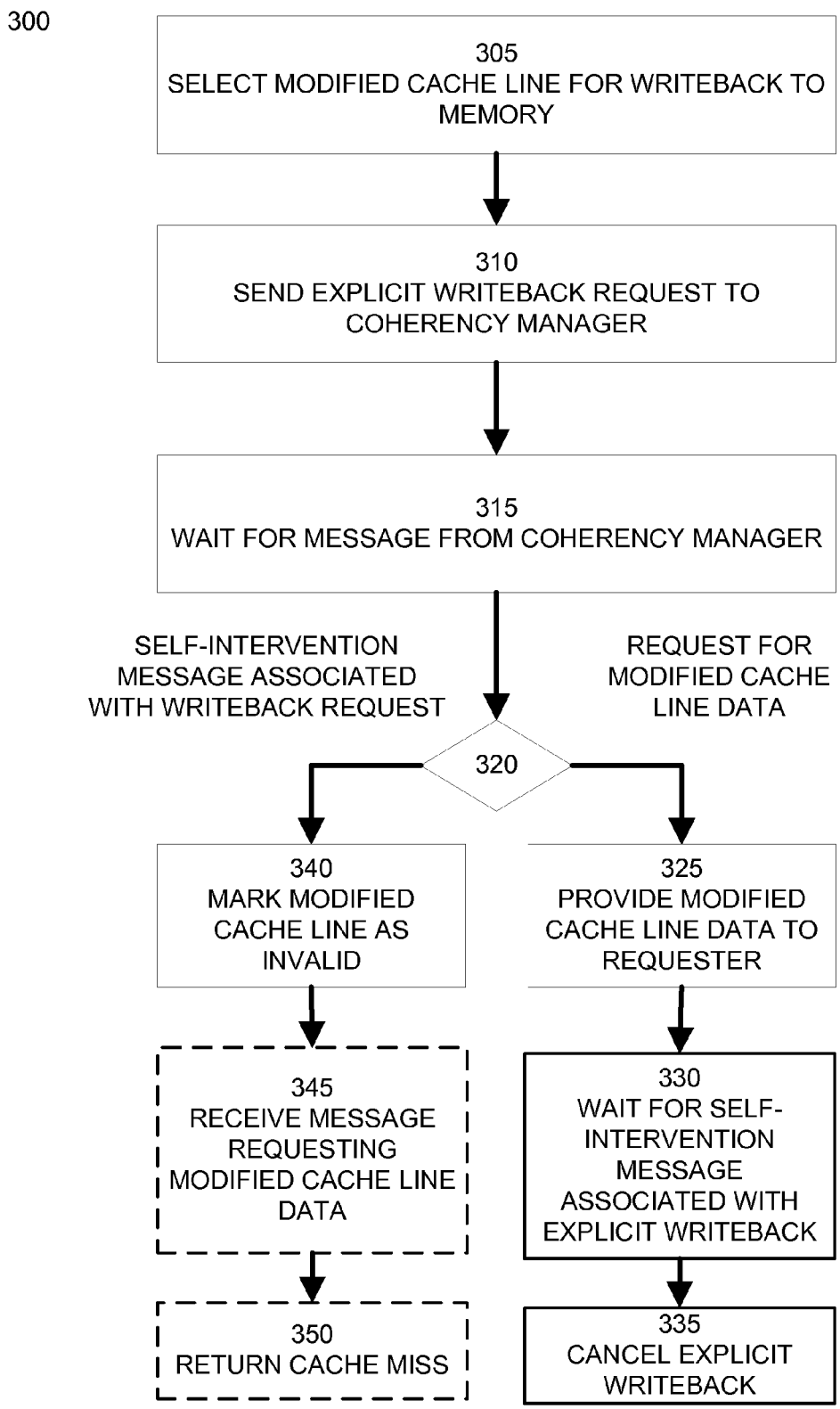
FIG. 3 illustrates a method of preventing interference between writeback operations and reads between cache memories.

To prevent errors from occurring and to ensure that the behavior of the processor core unit is consistent regardless of the order the cache coherency manager unit services the explicit and implicit writeback requests, FIG. 3 illustrates a method 300 of preventing interference between writeback operations and reads between cache memories.

Method 300 begins with step 305 selecting a cache line including modified data for writeback operation. At this time, another processor core unit may be requesting or have already requested data from the selected modified cache line. However, the first processor core unit would be unaware of any requests for the modified cache line at this time.

Step 310 sends an explicit writeback request to the cache coherency manager unit. In an embodiment, the explicit writeback request identifies the cache line storing the modified data and/or the system memory address that the modified data should be stored in. In some implementations, the explicit writeback request also includes the modified data to be written back to system memory or optionally a higher level cache memory.

As discussed above, the cache coherency manager unit can process requests such as the writeback request sent in step 310 and any competing requests from other processor core units in any order. To maintain cache coherency, in step 315 the processor core unit requesting the explicit writeback waits for a confirmation message from the cache coherency manager unit before allowing the selected cache line to be overwritten with different data. During this waiting period, the processor core unit will still be responsible for providing the modified cache line data to any other requesting processor core units. Additionally, during this waiting period, the processor core unit and its associated processor core may execute other instructions, process other data, and provide any other data to any other requesting processor core units, rather than stalling or sitting idle.

Upon receiving a message from the cache coherency manager unit, decision block 320 evaluates the received message. If the message received from the cache coherency manager unit is a request for the modified cache line data, then step 325 provides this modified data to the requesting processor core unit. This can occur if another processor core unit requests the modified cache line data at approximately the same time as the writeback request is issued and the cache coherency manager unit processes the data request before the writeback request.

In providing the modified cache line data to another processor core unit in step 325, an implicit writeback is automatically triggered as described in method 250. The implicit writeback will eventually writeback the modified cache data line to system memory and change the cache coherency status of the modified cache line from "modified" to "shared" or from "modified" to "invalid." In an embodiment of step 325, the processor core unit including the modified cache line data communicates a copy of the modified data to the cache coherency manager unit, which in turn forwards the copy of the modified data to the requesting processor core unit. Meanwhile, the cache coherency manager performs the writeback of the modified data to system memory or shared higher-level cache memory.

Following step 325, the processor core unit still has an pending explicit writeback request. In step 330, the processor core unit awaits the return of the self-intervention message associated with the explicit writeback request from the cache coherency manager unit. While waiting for this self-intervention message, the processor core unit and its associated processor core may execute other instructions, process other data, and provide any other data to any other requesting processor core units, rather than stalling or sitting idle.

Upon receiving the self-intervention message associated with the explicit writeback request, the processor core unit cancels the explicit writeback in step 335. In an embodiment, the processor core unit sends an intervention response message including a writeback cancellation indicator to the cache coherency manager unit to cancel the explicit writeback request. In an alternate embodiment, the processor core unit does not respond to the self-intervention message; the cache coherency manager unit interprets this as a cancellation of the explicit writeback request.

Conversely, if upon receiving a message from the cache coherency manager unit, the decision block 320 determines that the message is a self-intervention message associated with the writeback request sent in step 310, then method 300 proceeds to step 340.

Step 340 marks the selected modified cache line as invalid. This allows the processor core unit to use the selected cache line to store other data. Once the selected cache line is marked as invalid, the processor core unit is no longer responsible for providing the modified cache line data to any requesting processor cores. Instead, if another processor core requires this data, it must be retrieved from another location, such as from system memory or an optional higher level cache memory. At this point, the processor core unit is finished with the explicit writeback operation. At this point in time, the modified cache line data has either been written back to system memory or is in the process of being written back to system memory.

While the processor core unit is receiving and processing the self-intervention message associated with the writeback request in steps 320 and 340, the cache coherency manager may be performing other tasks. Upon completion of step 340, the processor core unit will provide a intervention message response to the cache coherency manager unit. In this case, the intervention message response does not include a cancellation of a writeback. As a result, the cache coherency manager unit will complete the writeback of the modified data to system memory or shared higher-level cache memory so that the modified data will be accessible to any of the processor core units in either system memory or a higher-level shared cache memory.

Following step 340, a processor core unit may yet receive a message requesting the modified cache line data. This can occur if another processor core unit requests the modified cache line data at approximately the same time as the writeback request is issued and the cache coherency manager unit processes the writeback request first. In this case, in optional step 345, the processor core unit formerly storing the modified cache line receives a message requesting for the modified cache line data. Because this cache line is now marked as invalid, the processor core unit in step 350 returns a cache miss response to the cache coherency manager unit and/or the requesting processor core unit. The request for the modified cache data will then be fulfilled by retrieving the data from system memory or optionally a higher level cache memory.

In a further embodiment, the processor core unit does not need to maintain a record of previously issued writeback requests to implement method 300. In this embodiment, the cache coherency data associated with a cache line is used to indicate whether the writeback request should be cancelled or execution when the self-intervention request is received. If a self-intervention request is received by a processor core unit and the associated cache line has a cache coherency value of "shared" or "invalid," this indicates to the processor core unit that an implicit writeback of this cache line has already occurred and the explicit writeback can be cancelled. If the associated cache line has a cache coherency value of "modified" when the self-intervention request is received by the processor core unit, this indicates to the processor that the cache line still needs to be written back to system memory or an optional higher level cache memory.

Figure 4:
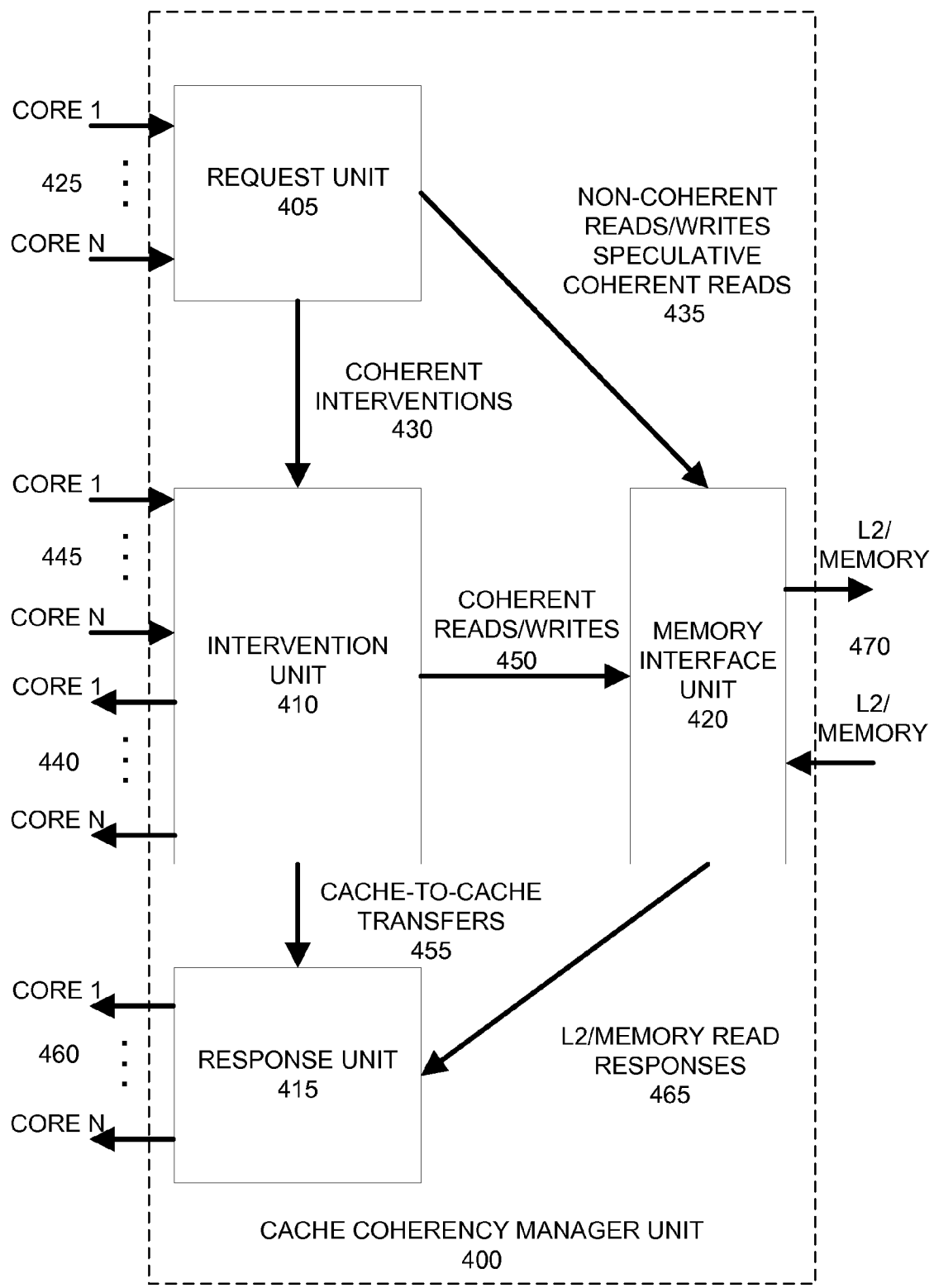
FIG. 4 illustrates a cache coherency manager unit of a processor according to an embodiment of the invention.

FIG. 4 illustrates a cache coherency manager unit 400 of a processor according to an embodiment of the invention. Cache coherency manager unit 400 includes a request unit 405, an intervention unit 410, a response unit 415, and a memory interface unit 420. The request unit 405 includes inputs 425 for receiving read requests, write requests, writeback requests, and other cache memory related requests from N processor core units, where N is any positive integer. The request unit 405 sends non-coherent read and write requests, which are read and write requests that do not require consistency with data in other processor core unit cache memories, and speculative coherent reads to memory interface unit 420 via connection 435. These requests also include explicit and implicit writeback requests of modified cache data. For coherent memory accesses, which require data to be consistent in cache processor core cache memories and system memory, the request unit 405 sends coherent intervention messages, such as self-intervention messages, to the intervention unit 410 via connection 430.

Intervention unit 410 issues intervention messages, such as self-intervention messages, via outputs 440 to the N processor core units. Intervention messages can also include forwarded requests for data received from other processor core units via request unit 405. The responses to intervention messages, which can include data requested by other processor core units, are received by the intervention unit 410 via inputs 445. If a processor core unit requests data that is stored in the cache of another processor core unit, this data is returned to the intervention unit 410 via inputs 445. The intervention unit 410 then forwards this data to the response unit 415 via connection 455, where it will be communicated back to the requesting processor core unit.

If processor core unit requests data for reading or writing that is not stored in the cache of another processor core unit, then intervention unit 410 can request access to this data by sending a coherent read or write request to memory interface unit 420 via connection 450.

The memory interface unit receives non-coherent read and write requests, coherent read and write requests, and writeback requests from the request unit 405 and intervention unit 410. Memory interface unit 420 accesses system memory and/or higher level cache memories, such as an L2 cache memory, via inputs and outputs 470 to fulfill these requests. The data retrieved from system memory and/or higher level cache memory in response to these memory access requests is forwarded to the response unit 415 via connection 465. The response unit 415 returns requested data to the appropriate processor core unit via outputs 460, whether the data was retrieved from another processor core unit, from system memory, or from optional higher-level cache memory.

In an embodiment of cache coherency manager unit 400, the request unit 405, the intervention unit 410, the response unit 415, and the memory interface unit 420 include data paths for sending and/or receiving cached data to or from processor core units. Each of these data paths introduces complexity and substantial overhead into the cache coherency manager unit 400.

To reduce the complexity of the cache coherency manager unit 400, an alternate embodiment of the cache coherency manager unit 400 eliminates the data paths in the request unit for receiving cached data from processor core units. This embodiment of cache coherency manager unit 400 includes a request unit 405 that receives read requests, write requests, and writeback requests from processor core units. The write requests and writeback requests do not include the data to written to memory. Instead, this embodiment of the cache coherency manager leverages the data paths of the intervention unit 410 to communicate write and writeback data from processor core units to the cache coherency manager unit 400. As a result, the complexity of the request unit 405 is reduced.

Figure 5:
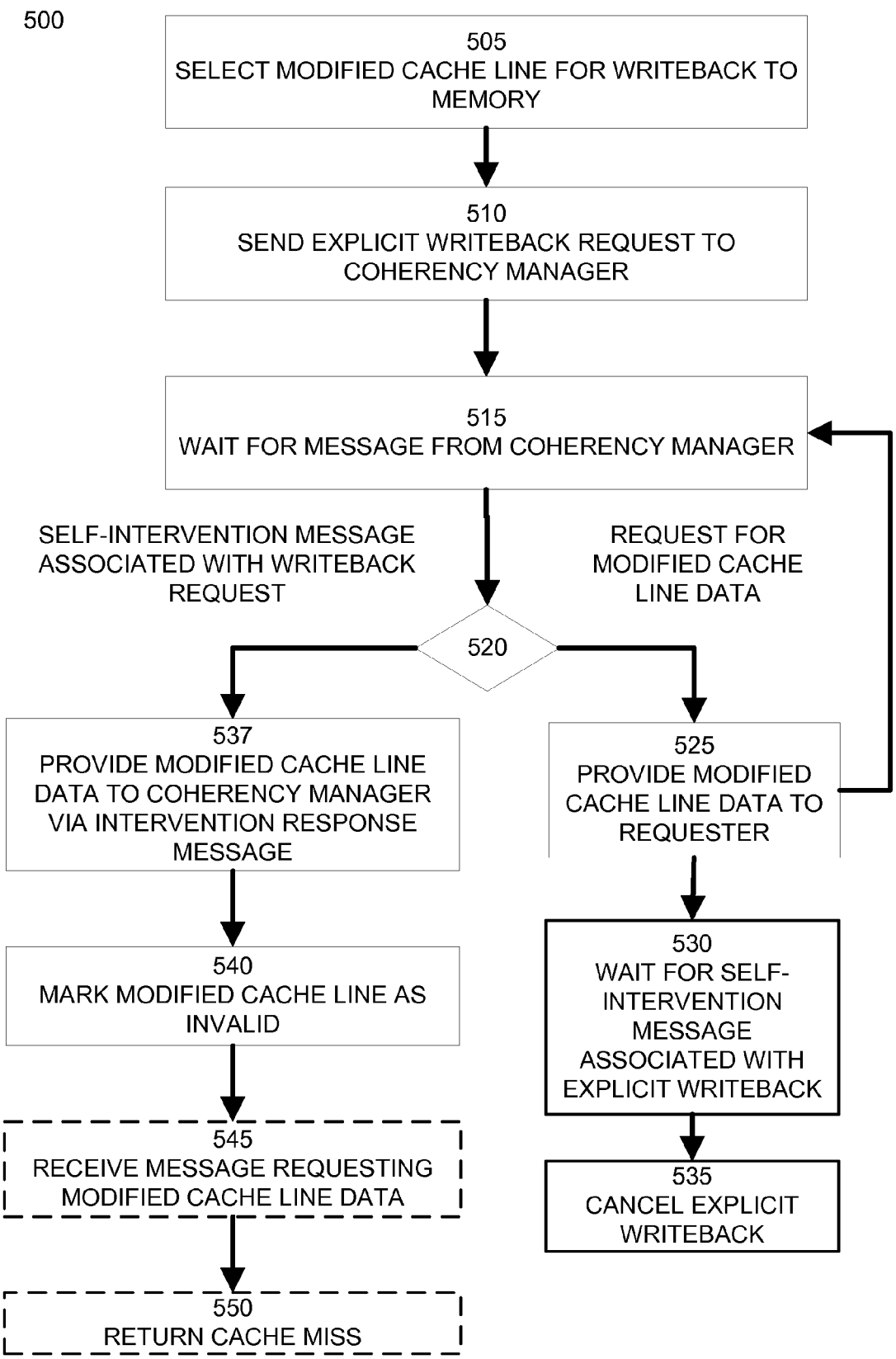
FIG. 5 illustrates a method of performing a writeback operation that reduces the complexity of a cache coherency manager unit according to an embodiment of the invention.

For this embodiment of the cache coherency manager unit to operate correctly with a request unit 405 without data paths for cached data, writeback operations are modified from that described above in FIG. 2A. FIG. 5 illustrates a method 500 of performing a writeback operation that reduces the complexity of a cache coherency manager unit according to an embodiment of the invention.

Method 500 begins in step 505 with a first processor core selecting a cache line including modified data for writeback operation. At this time, another processor core unit may be requesting or have already requested data from the selected modified cache line. However, the first processor core unit would be unaware of any requests for the modified cache line at this time.

In step 510, the first processor core sends an explicit writeback request to the cache coherency manager unit. In an embodiment, the explicit writeback request identifies the cache line storing the modified data and/or the system memory address that the modified data should be stored in. In some implementations, the explicit writeback request does not include the modified data.

As discussed above, the cache coherency manager unit can process requests such as the writeback request sent in step 510 and any competing requests from other processor core units in any order. To maintain cache coherency, in step 515 the processor core unit requesting the explicit writeback waits for a confirmation message from the cache coherency manager unit before allowing the selected cache line to be overwritten with different data. During this waiting period, the processor core unit will still be responsible for providing the modified cache line data to any other requesting processor core units. Additionally, during this waiting period, the processor core unit and its associated processor core may execute other instructions, process other data, and provide any other data to any other requesting processor core units, rather than stalling or sitting idle.

Upon receiving a message from the cache coherency manager unit, decision block 520 evaluates the received message. If the message received from the cache coherency manager unit is a request for the modified cache line data, then step 525 provides this modified data to the requesting processor core unit. This can occur if another processor core unit requests the modified cache line data at approximately the same time as the writeback request is issued and the cache coherency manager unit processes the data request before the writeback request.

In providing the modified cache line data to another processor core unit in step 525, an implicit writeback is automatically triggered as described in method 250. The implicit writeback will eventually writeback the modified cache data line to system memory and change the cache coherency status of the modified cache line from "modified" to "shared." In an embodiment of step 525, the processor core unit including the modified cache line data communicates a copy of the modified data to the cache coherency manager unit via a connection with its intervention unit, which in turn forwards the copy of the modified data to the requesting processor core unit.

Following step 525, the processor core unit still has an pending explicit writeback request. In step 530, the processor core unit awaits the return of the self-intervention message associated with the explicit writeback request from the cache coherency manager unit. While waiting for this self-intervention message, the processor core unit and its associated processor core may execute other instructions, process other data, and provide any other data to any other requesting processor core units, rather than stalling or sitting idle.

Upon receiving the self-intervention message associated with the explicit writeback request, the processor core unit cancels the explicit writeback in step 535. In an embodiment, the processor core unit sends a cancellation message to the cache coherency manager unit to cancel the explicit writeback request. In an alternate embodiment, the processor core unit does not respond to the self-intervention message; the cache coherency manager unit interprets this as a cancellation of the explicit writeback request.

Conversely, if upon receiving a message from the cache coherency manager unit, the decision block 520 determines that the message is a self-intervention message associated with the writeback request sent in step 510, then method 500 proceeds to step 537.

Step 537 provides an intervention response message in response the self-intervention message. The intervention response message includes the modified cache line data associated with the writeback request. This intervention response message is received by the intervention unit of the cache coherency manager. Because the intervention unit of the cache coherency manager already requires a data path for receiving cached data to facilitate data transfers between processor core units, providing modified cache line data associated with writeback operations to the intervention unit adds little or no additional complexity to the intervention unit.

Step 540 marks the selected modified cache line as invalid. This allows the processor core unit to use the selected cache line to store other data. Once the selected cache line is marked as invalid, the processor core unit is no longer responsible for providing the modified cache line data to any requesting processor cores. Instead, if another processor core requires this data, it must be retrieved from another location, such as from system memory or an optional higher level cache memory. At this point, the processor core unit is finished with the explicit writeback operation. At this point in time, the cache coherency manager unit completes the writeback of the modified cache line data, so that the modified data is available to other processor core units in either system memory or a higher-level shared cache memory.

Following step 540, a processor core unit may yet receive a message requesting the modified cache line data. This can occur if another processor core unit requests the modified cache line data at approximately the same time as the writeback request is issued and the cache coherency manager unit processes the writeback request first. In this case, in optional step 545, the processor core unit formerly storing the modified cache line receives a message requesting for the modified cache line data. Because this cache line is now marked as invalid, the processor core unit in step 550 returns a cache miss response to the cache coherency manager unit and/or the requesting processor core unit. The request for the modified cache data will then be fulfilled by retrieving the data from system memory or optionally a higher level cache memory.

FIG. 6 illustrates an example computer system 1000 suitable for use with an embodiment of the invention. Computer system 1000 typically includes one or more output devices 1100, including display devices such as a CRT, LCD, OLED, LED, gas plasma, electronic ink, or other types of displays, speakers and other audio output devices; and haptic output devices such as vibrating actuators; computer 1200; a keyboard 1300; input devices 1400; and a network interface 1500. Input devices 1400 can include a computer mouse, a trackball, joystick, track pad, graphics tablet, touch screen, microphone, various sensors, and/or other wired or wireless input devices that allow a user or the environment to interact with computer system 1000. Embodiments of network interface 1500 typically provides wired or wireless communication with an electronic communications network, such as a local area network, a wide area network, for example the Internet, and/or virtual networks, for example a virtual private network (VPN). Network interface 1500 can implement one or more wired or wireless networking technologies, including Ethernet, one or more of the 802.11 standards, Bluetooth, and ultra-wideband networking technologies.

Computer 1200 typically includes components such as one or more general purpose processors 1600, and memory storage devices, such as a random access memory (RAM) 1700 and non-volatile memory 1800. Non-volatile memory 1800 can include floppy disks; fixed or removable hard disks; optical storage media such as DVD-ROM, CD-ROM, and bar codes; non-volatile semiconductor memory devices such as flash memories; read-only-memories (ROMS); battery-backed volatile memories; paper or other printing mediums; and networked storage devices. System bus 1900 interconnects the above components. Processors 1600 can include embodiments of the above described processors, such as processors 100, 150, and 400.

RAM 1700 and non-volatile memory 1800 are examples of tangible media for storage of data, audio/video files, computer programs, applet interpreters or compilers, virtual machines, and embodiments of the herein described invention. For example, embodiments of the above described processors may be represented as human-readable or computer-usable programs and data files that enable the design, description, modeling, simulation, testing, integration, and/or fabrication of integrated circuits and/or computer systems including embodiments of the invention. Such programs and data files may be used to implement embodiments of the invention as separate integrated circuits or used to integrate embodiments of the invention with other components to form combined integrated circuits, such as microprocessors, microcontrollers, system on a chip (SoC), digital signal processors, embedded processors, or application specific integrated circuits (ASICs).

Programs and data files expressing embodiments of the invention can use general-purpose programming or scripting languages, such as C or C++; hardware description languages, such as VHDL or Verilog; microcode implemented in RAM, ROM, or hard-wired and adapted to control and coordinate the operation of components within a processor or other integrated circuit; and/or standard or proprietary format data files suitable for use with electronic design automation software applications known in the art. Programs and data files can express embodiments of the invention at various levels of abstraction, including as a functional description, as a synthesized netlist of logic gates and other circuit components, and as an integrated circuit layout or set of masks suitable for use with semiconductor fabrication processes. These programs and data files can be processed by electronic design automation software executed by a computer to design a processor and generate masks for its fabrication.

Further embodiments of computer 1200 can include specialized input, output, and communications subsystems for configuring, operating, simulating, testing, and communicating with specialized hardware and software used in the design, testing, and fabrication of integrated circuits.

Further embodiments can be envisioned to one of ordinary skill in the art from the specification and figures. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

It is understood that the apparatus and method described herein may be included in a semiconductor intellectual property core, such as a microprocessor core (e.g. expressed as a hardware description language description or a synthesized netlist) and transformed to hardware in the production of integrated circuits. Additionally, embodiments of the invention may be implemented using combinations of hardware and software, including micro-code suitable for execution within a processor. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of preserving a modified copy of data in a cache line of a cache memory associated with a processor core unit in a processor including at least two processor core units, the method comprising:

selecting a cache line including modified cache data for a writeback operation;

sending a writeback request for the selected cache line from a first processor core unit to a cache coherency manager unit to initiate the writeback operation;

receiving a first intervention message from the cache coherency manager unit to the first processor core unit;

determining, by the first processor core unit, if the first intervention message is associated with a request for the modified cache data from a requesting processor core unit; and in response to the determination that the first intervention message is associated with the request for the modified cache data from the requesting processor core unit, providing the modified cache data to the requesting processor core unit and using the first processor core unit to cancel the writeback operation.

2. The method of claim 1, wherein cancelling the writeback request comprising:

receiving an additional intervention message from the cache coherency manager unit;

determining if the additional intervention message is associated with the writeback request; and in response to the determination that the additional intervention message is associated with the writeback request, sending an intervention message response including a writeback request cancellation indicator to the cache coherency manager unit.

3. The method of claim 1, wherein cancelling the writeback request comprising:

receiving an additional intervention message from the cache coherency manager unit;

determining if the additional intervention message is associated with the writeback request; and in response to the determination that the additional intervention message is associated with the writeback request, inhibiting the sending of an intervention message response to the cache coherency manager unit, thereby indicating to the cache coherency manager unit that the writeback request should be cancelled.

4. The method of claim 1, further comprising:

determining if the first intervention message is associated with the writeback request; and in response to the determination that the first intervention message is associated with the writeback request, marking the selected cache line as invalid.

5. The method of claim 1, further comprising:

receiving an additional intervention message from the cache coherency manager unit;

determining if the additional intervention message is associated with the request for the modified cache data; and in response to the determination that the additional intervention message is associated with the request for the modified cache data, sending a cache miss message to the requesting processor core.

6. The method of claim 1, wherein providing the modified cache data to the requesting processor core unit comprising sending an intervention message response to the cache coherency manager unit including the modified cache data.

7. A method of preserving a modified copy of data in a cache line of a cache memory associated with a processor core unit in a processor including at least two processor core units, the method comprising:

selecting a cache line including modified cache data for a writeback operation;

sending a writeback request for the selected cache line from a first processor core unit to a cache coherency manager unit to initiate the writeback operation;

receiving a first intervention message associated with the writeback request from the cache coherency manager unit to the first processor core unit;

determining, by the first processor core unit, if the first intervention message was received after receiving a request for the modified cache data from a requesting processor core unit; and in response to the determination that the first intervention message was received after receiving a request for the modified cache data, using the first processor core unit to cancel the writeback operation.

8. The method of claim 7, wherein determining if the first intervention message was received after receiving the request for the modified cache data comprises evaluating a cache coherency attribute value associated with the selected cache line.

9. The method of claim 8, wherein the cache coherency attribute value set to modified indicates that the first intervention message was not received after receiving a request for the modified cache data.

10. The method of claim 8, wherein the cache coherency attribute value set to shared indicates that the first intervention message was received after receiving a request for the modified cache data.

11. The method of claim 8, wherein the cache coherency attribute value set to invalid indicates that the first intervention message was received after receiving a request for the modified cache data.

12. The method of claim 7, further comprising:

in response to determining that the first intervention message was not received after receiving the request for the modified cache data, marking the selected cache line as invalid.

13. The method of claim 7, wherein the request for the modified cache data is received is included in an additional intervention message from the cache coherency manager unit.

14. The method of claim 7, wherein cancelling the writeback request includes sending an intervention message response including a writeback request cancellation indicator to the cache coherency manager unit.

15. The method of claim 7, wherein cancelling the writeback request includes inhibiting the sending of an intervention message response to the cache coherency manager unit, thereby indicating to the cache coherency manager unit that the writeback request should be cancelled.

16. A computer-readable storage medium including instructions defining logic circuits of a processor and adapted to be used by an electronic design automation application executed by a computer, wherein the logic circuits are adapted to perform an operation comprising:

selecting a cache line including modified cache data for a writeback operation;

sending a writeback request for the selected cache line from a first processor core unit to a cache coherency manager unit to initiate the writeback operation;

receiving a first intervention message from the cache coherency manager unit to the first processor core unit;

determining, by the first processor core unit, if the first intervention message is associated with a request for the modified cache data from a requesting processor core unit; and in response to the determination that the first intervention message is associated with the request for the modified cache data from the requesting processor core unit, providing the modified cache data to the requesting processor core unit and using the first processor core unit to cancel the writeback operation.

17. The computer-readable medium of claim 16, wherein cancelling the writeback request comprising:

receiving an additional intervention message from the cache coherency manager unit;

determining if the additional intervention message is associated with the writeback request; and in response to the determination that the additional intervention message is associated with the writeback request, sending an intervention message response including a writeback request cancellation indicator to the cache coherency manager unit.

18. The computer-readable medium of claim 16, wherein cancelling the writeback request comprising:

receiving an additional intervention message from the cache coherency manager unit;

determining if the additional intervention message is associated with the writeback request; and in response to the determination that the additional intervention message is associated with the writeback request, inhibiting the sending of an intervention message response to the cache coherency manager unit, thereby indicating to the cache coherency manager unit that the writeback request should be cancelled.

19. The computer-readable medium of claim 16, further comprising:

determining if the first intervention message is associated with the writeback request; and in response to the determination that the first intervention message is associated with the writeback request, marking the selected cache line as invalid.

* * * * *